US012776019B2

(12) United States Patent
Haynes et al.

(10) Patent No.: US 12,776,019 B2
(45) Date of Patent: Oct. 27, 2026

(54) FEATURE INSPECTION SYSTEM

(71) Applicant: Spirit AeroSystems, Inc., Wichita, KS (US)

(72) Inventors: Mark Davis Haynes, Andover, KS (US); Glen Paul Cork, Wichita, KS (US); Bharath Achyutha Rao, Wichita, KS (US); John Thomas Baumfalk-Lee, Wichita, KS (US); Matthew W. McKenna, Wichita, KS (US); Bruce E. Gabel, Wichita, KS (US); Scott Bishop, Wichita, KS (US); Gregorio Balandran, Wichita, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 583 days.

(21) Appl. No.: 17/465,967

(22) Filed: Sep. 3, 2021

(65) Prior Publication Data

US 2022/0092766 A1 Mar. 24, 2022

Related U.S. Application Data

(63) Continuation-in-part of application No. 17/024,792, filed on Sep. 18, 2020, now Pat. No. 11,631,184.

(51) Int. Cl.
*G06T 7/00* (2017.01)
*B64U 10/13* (2023.01)
(Continued)

(52) U.S. Cl.
CPC ............ *G06T 7/0004* (2013.01); *B64U 10/13* (2023.01); *G01C 11/02* (2013.01); *G01C 11/04* (2013.01);
(Continued)

(58) Field of Classification Search
CPC ......... G06T 7/0004; G06T 7/292; G06T 7/73; G06T 2207/10032; B64C 39/024;
(Continued)

(56) References Cited

U.S. PATENT DOCUMENTS 5,910,894 A 6/1999 Pryor
7,643,893 B2 * 1/2010 Troy .................... G05D 1/0033 700/65
(Continued)

FOREIGN PATENT DOCUMENTS

JP 2015000580 1/2015
JP 2019219378 12/2019
(Continued)

OTHER PUBLICATIONS

International Search Report and Written Opinion in related PCT Application PCT/US2022/042491 mailed Dec. 21, 2022, 10 pages.
(Continued)

*Primary Examiner* — Kathleen Y Dulaney
(74) *Attorney, Agent, or Firm* — Stinson LLP

(57) ABSTRACT

A system for inspecting features of an airframe, the system including a feature inspection device configured to measure an aspect of a first feature and a tracking subsystem configured to determine a position of the feature inspection device when the feature inspection device measures the aspect of the first feature. The system is configured to determine a position of the first feature on the airframe via the feature inspection device and the tracking subsystem, the determination of the position of the first feature being independent from the measurement of the aspect of the first feature.

5 Claims, 11 Drawing Sheets

(51) Int. Cl.

| | |
|---|---|
| ***B64U 101/26*** | (2023.01) |
| ***B64U 101/32*** | (2023.01) |
| ***B64U 101/70*** | (2023.01) |
| ***G01C 11/02*** | (2006.01) |
| ***G01C 11/04*** | (2006.01) |
| ***G01N 21/88*** | (2006.01) |
| ***G06T 7/292*** | (2017.01) |
| ***G06T 7/73*** | (2017.01) |
| ***H04N 23/90*** | (2023.01) |

(52) U.S. Cl.
CPC ......... *G01N 21/8851* (2013.01); *G06T 7/292* (2017.01); *G06T 7/73* (2017.01); *H04N 23/90* (2023.01); *B64U 2101/26* (2023.01); *B64U 2101/32* (2023.01); *B64U 2101/70* (2023.01); *G06T 2207/10032* (2013.01)

(58) Field of Classification Search
CPC ........ G01C 11/02; G01C 11/04; G01C 21/20; G01N 21/8851; G01N 21/9515; H04N 23/90; B64U 2101/30; B64U 2101/32; B64U 10/13; B64U 2201/10; B64F 5/60
USPC ..................... 348/92; 382/103, 141; 700/110
See application file for complete search history.

(56) References Cited

U.S. PATENT DOCUMENTS

| | | | | |
|---|---|---|---|---|
| 8,788,138 | B1 * | 7/2014 | Yogesha | B64F 5/60 701/31.4 |
| 10,712,286 | B1 * | 7/2020 | Fetzer | G01N 21/9515 |
| 11,106,208 | B2 * | 8/2021 | Alshamrani | G06K 7/1417 |
| 11,238,675 | B2 * | 2/2022 | Troy | H04N 23/69 |
| 11,410,420 | B1 * | 8/2022 | Roy | H04W 4/80 |
| 2005/0155915 | A1 * | 7/2005 | Ong | G01N 21/952 709/939 |
| 2009/0165317 | A1 * | 7/2009 | Little | G01N 29/265 33/503 |
| 2010/0010660 | A1 | 1/2010 | Salour | |
| 2011/0292205 | A1 | 12/2011 | Yuguchi et al. | |
| 2013/0132034 | A1 | 5/2013 | Wilson | |
| 2014/0046589 | A1 | 2/2014 | Metzler et al. | |
| 2014/0185911 | A1 * | 7/2014 | Steffenson | G06T 7/75 382/141 |
| 2014/0200832 | A1 * | 7/2014 | Troy | G01N 27/00 702/38 |
| 2015/0012171 | A1 | 1/2015 | Richter et al. | |
| 2016/0153913 | A1 | 6/2016 | Kesler | |
| 2016/0298269 | A1 | 10/2016 | Cha et al. | |
| 2016/0349746 | A1 * | 12/2016 | Grau | G05D 1/0094 |
| 2017/0212529 | A1 * | 7/2017 | Kumar | G01S 19/48 |
| 2017/0352159 | A1 * | 12/2017 | Aravkin | G06T 17/00 |
| 2018/0089622 | A1 * | 3/2018 | Burch | G06Q 10/0833 |
| 2018/0120196 | A1 * | 5/2018 | Georgeson | G01N 21/88 |
| 2018/0170540 | A1 * | 6/2018 | Claybrough | B64F 5/60 |
| 2018/0259461 | A1 | 9/2018 | Haynes | |
| 2018/0335404 | A1 * | 11/2018 | Amer | G01N 25/72 |
| 2019/0114387 | A1 * | 4/2019 | Wolfe | B64F 5/40 |
| 2019/0130768 | A1 * | 5/2019 | Clark | B64U 50/19 |
| 2019/0138011 | A1 * | 5/2019 | Bloeckner | G05D 1/0094 |
| 2019/0161186 | A1 * | 5/2019 | Chen | G06F 18/23213 |
| 2019/0220019 | A1 * | 7/2019 | Tan | G01M 5/0091 |
| 2019/0266715 | A1 * | 8/2019 | Myers | B64U 80/25 |
| 2019/0339207 | A1 * | 11/2019 | Finn | B25J 19/027 |
| 2019/0382135 | A1 | 12/2019 | Gonzalez et al. | |
| 2020/0097721 | A1 * | 3/2020 | Yakimenko | G05D 1/0094 |
| 2020/0334499 | A1 * | 10/2020 | Ma | G06F 18/2413 |
| 2020/0377233 | A1 * | 12/2020 | Harvey | B64F 5/60 |
| 2021/0174492 | A1 | 6/2021 | Karaaslan | |
| 2021/0232141 | A1 * | 7/2021 | Georgeson | B64U 10/10 |
| 2021/0237381 | A1 * | 8/2021 | Hafenrichter | B29C 73/12 |
| 2021/0237867 | A1 * | 8/2021 | Georgeson | B05D 5/005 |
| 2021/0311504 | A1 * | 10/2021 | Chai | G05D 1/106 |
| 2021/0356255 | A1 * | 11/2021 | Sweers | G01B 5/18 |
| 2022/0092766 | A1 | 3/2022 | Haynes et al. | |
| 2022/0281617 | A1 * | 9/2022 | Morita | G06V 10/141 |
| 2023/0064115 | A1 * | 3/2023 | Elkins | B64C 39/024 |

FOREIGN PATENT DOCUMENTS

| | | |
|---|---|---|
| KR | 101707865 | 2/2017 |
| KR | 101718287 | 4/2017 |
| KR | 20180029973 | 3/2018 |

OTHER PUBLICATIONS

International Search Report and Written Opinion mailed Dec. 24, 2021 for PCT/US21/050163, Filed Sep. 14, 2021 and all references cited therein.

European Search Report, Europe Patent Application No. 21870042.5, dated Sep. 30, 2024, 11 pages, European Patent Office, Munich, Germany.

* cited by examiner

FEATURE INSPECTION SYSTEM

RELATED APPLICATIONS

This regular utility non-provisional patent application is a continuation-in-part and claims benefit with regard to all common subject matter of earlier-filed non-provisional U.S. patent application Ser. No. 17/024,792, filed Sep. 18, 2020, and titled "FEATURE INSPECTION SYSTEM". Application Ser. No. 17/024,792 is hereby incorporated by reference in its entirety into the present application.

BACKGROUND

Aircraft airframes include thousands of features that must be examined to ensure they conform to strict engineering specifications. Such examinations often involve more than one step. For example, fasteners are initially inspected via human tactile observation, which can be inconsistent between inspectors. Fasteners flagged based on tactile observation undergo final pass/fail measurements via a depth indicator. This two-step process is inefficient and ineffective because many flagged fasteners pass final pass/fail measurements, and many non-flagged fasteners are later discovered to be non-conforming.

Digital inspection devices can be used to scan fasteners, but scan data is difficult to process post-scan. For example, it is difficult to associate fastener measurements with the appropriate fastener position on the airframe. Some digital inspection devices measure fastener head heights in terms of the inspection device's position in space, thereby associating fastener head height measurements with corresponding fastener positions, but this produces low quality fastener head height measurements and is not very versatile.

Other inspection systems require significant infrastructure investment such as robotic manipulators and gantry systems. They also are human-controlled, which requires significant man-hours and induces variation, error, safety hazards, and suboptimal operation and accuracy.

SUMMARY

Embodiments of the present invention solve the above-mentioned problems and other related problems and provide a distinct advance in the art of feature inspection systems. More particularly, the present invention provides a feature inspection system that measures aspects of airframe features and independently determines positions and orientations of the airframe features.

An embodiment of the invention is a system for inspecting fasteners of an airframe. The feature inspection system broadly comprises a number of feature inspection devices, a tracking subsystem, and a number of computing devices.

The feature inspection devices are substantially similar, and each is configured to scan a number of fasteners. Each feature inspection device includes a frame, a scanner, a number of tracking targets, and an augmented reality projector.

The frame includes handles and contact pads. The frame spaces the scanner from the airframe to position the scanner in range of targeted fasteners.

The handles allow the user to position the feature inspection device against the airframe and hold the feature inspection device in position while the scanner scans the fasteners. The handles allow the user to steady the feature inspection device when the feature inspection device is positioned on top of the airframe and support the feature inspection device when the feature inspection device is positioned against a side or bottom of the airframe.

The contact pads contact the airframe without scratching or damaging the airframe. To that end, the contact pads may be a resilient rubber, felt, or any other suitable materials. On the other hand, the contact pads are rigid enough for the scanner to generate accurate readings.

The scanner may be a three-dimensional surface inspection sensor, an optical sensor, a camera, or any other suitable scanning component. The scanner may be contactless or a tactile sensor.

The tracking targets are passive or active targets positioned on specific locations on the frame. The tracking targets provide reference points for the tracking subsystem to determine a position and orientation of the feature inspection device.

The augmented reality projector may include user inputs, a touchscreen, a display, status indicators, and the like. The augmented reality projector provides scanning readouts, alignment information, feature data, and other information to the user. The augmented reality projector may display the above information directly on the airframe.

The tracking subsystem includes a number of cameras and a tracking computer. The tracking subsystem ensures spatial tracking of the feature inspection device (and hence the fasteners) relative to an aircraft coordinate system that moves with the airframe.

The cameras are spaced apart from each other near the airframe such that the entire airframe is visible from as many cameras as possible. To that end, the cameras may be placed in several locations near the airframe on scaffolding so that the feature inspection device is in view of at least one of the cameras during feature scanning.

The tracking computer may include a processor, a memory, user inputs, a display, and the like. The tracking computer may also include circuit boards and/or other electronic components such as a transceiver or external connection for communicating with other computing devices of the feature inspection system. The tracking computer determines the position and orientation of the feature inspection device and the airframe via the cameras.

The computing devices include a master computing device, a number of client computing devices, and a number of remote/networked computing devices. The computing devices may be connected to each other via a wired or wireless communication network.

The master computing device includes a processor, a memory, a communication element, a number of inputs, a display, and/or other computing components for managing the client computing devices and remote computing devices. To that end, the master computing device may be a hub in wired or wireless communication with the above computing devices.

The client computing devices are front-end computing devices communicatively linked to the master computing device and may be desktop computers, laptop computers, tablets, handheld computing devices, kiosks, and the like. The client computing devices may include human machine interfaces HMIs used directly by inspectors for inputting data into and reviewing data from the feature inspection system. For example, the HMIs may be a graphical representation of the airframe including the fasteners displayed on an interactive touch display board, a computer screen, or the like. The HMIs may interact with many different feature inspection devices and work cells such that the feature inspection system is scalable. The HMIs may also be used for fastener map management.

The remote computing devices are back-end computing devices communicatively linked to the master computing device and may be desktop computers, servers, mainframes, data repositories, and the like. The remote computing devices store and analyze data collected by the tracking subsystem and the client computing devices.

In use, one of the feature inspection devices may be held against the airframe such that a set of features is in range of and/or framed by the scanner. The scanner may then be activated to capture measurement data or imagery of the features. For example, the scanner may obtain a scan image and a raw image of a number of fasteners.

The tracking subsystem determines a position and orientation of the feature inspection device relative to the airframe when the scanner is activated. Specifically, the tracking subsystem detects the tracking targets on the feature inspection device via the cameras.

The feature inspection device or one of the computing devices may then process and/or store the captured measurement data. The raw images obtained by the scanner may include relevant text or visual information near the features, which may be useful for later review or contextualizing feature data. The system also determines a position and orientation of each inspected fastener based on the position and orientation of the feature inspection device when the fastener is scanned. This is done independently of the scan itself.

The augmented reality projector then displays or projects onto the airframe information regarding the current scan. For example, the augmented reality projector may indicate which features have been scanned and may present measurement results of the scan.

Head height measurement data and other measurement data may be associated with corresponding fasteners in a fastener map. This data may be reviewed in the fastener map via one of the HMIs or one of the client computing devices.

Final scanning and tracking results from the feature inspection device may be stored via the remote computing devices. The remote computing devices provide permanent enterprise databasing of the measurement results and generation of static reports per each line unit.

The feature inspection system provides several advantages. For example, the feature inspection system automates feature inspection for large aerostructure assemblies. In one embodiment, the feature inspection system provides real time, continuous, precision measurement and recording of fastener head heights and independently determines fastener positions and fastener orientations in an aircraft coordinate reference frame. Measurement data and positions and orientations of the fasteners on the airframe are digitally logged for fastener reworking during manufacturing and for record-keeping throughout the life of the aircraft.

The feature inspection system generates automated intelligent rework plans that do minimal damage at minimal cost to achieve a conforming product. The feature inspection system performs analytical studies to predict and determine areas of concerns before issues occur. To that end, the feature inspection system may also track fabrication tools to determine correlation/causation of mechanic behavior and non-conforming product in a sustained continuous real-time production environment.

Another embodiment of the invention is a photogrammetry surveying system configured to integrate autonomous flight with photogrammetry. The photogrammetry surveying system broadly comprises an unmanned aerial vehicle (UAV), a photogrammetry camera, a tracking subsystem, and a number of computing devices. The photogrammetry surveying system may also include additional unmanned aerial vehicles, photogrammetry cameras, tracking components, inspection devices, and computing devices so that the photogrammetry surveying system is scalable, replicable, and adaptable to various airframe fabrication programs and other construction programs.

The UAV includes a frame, a number of rotors, a power supply, a number of tracking targets, and an on-board controller. The UAV may be autonomous, semi-autonomous, or remotely controlled. The UAV may be a quadcopter or similar device.

The tracking targets may be passive or active targets or any other suitable detectable elements positioned on the frame. The tracking targets provide reference points for determining a position and orientation of the UAV.

The on-board controller dictates movement and actions of the UAV and optionally of the photogrammetry camera and may include a processor, a memory, and other computing elements such as circuit boards and a transceiver or external connection for communicating with external computing systems.

The photogrammetry camera is configured to generate a series of images of a single object or feature for performing 3D measurements. The photogrammetry camera may have high precision with accuracy of a few thousandths of an inch. The photogrammetry camera may be mounted to the UAV via a gimbal.

The tracking subsystem includes a number of tracking cameras and a tracking computer. The tracking subsystem ensures tracking of the UAV (and hence the features being inspected) relative to an aircraft coordinate system that moves with an airframe.

The tracking cameras are spaced apart from each other near the airframe. The tracking cameras may be placed in several locations near the airframe on scaffolding so that the UAV is in view of at least one of the tracking cameras. The tracking cameras provide information about the position and orientation of the UAV and the airframe.

The tracking computer may include a processor, a memory, user inputs, a display, and the like. The tracking computer may also include circuit boards and/or other electronic components such as a transceiver or external connection for communicating with other computing devices of the photogrammetry surveying system. The tracking computer determines the position and orientation of the UAV and the airframe via the tracking cameras.

The tracking subsystem may be a macro area precision position system (MAPPS) camera network system and may be compatible with cross measurement from other metrology devices. MAPPS achieves precise positional tracking of objects in a dynamic space in real time via the tracking cameras and tracking targets to provide provide autonomous feedback to the on-board controller of the UAV. Photogrammetry surveys of visible targets enables rigid body creation and motion tracking with aligned point sets coming from tooling reference locations.

The computing devices include a master computing device, a number of client computing devices, and a number of remote/networked computing devices. The computing devices may be connected to each other via a wired or wireless communication network.

The master computing device may include a processor, a memory, a plurality of inputs, and a display. The master computing device may also include circuit boards and/or other electronic components such as a transceiver or external connection for communicating with external computing systems.

The client computing devices are front-end computing devices linked to the master computing device and may be desktop computers, laptop computers, tablets, handheld computing devices, kiosks, and the like. The client computing devices may include human machine interfaces HMIs used directly by inspectors for inputting data into and reviewing data from the photogrammetry surveying system. For example, the HMIs may be a graphical representation of the airframe including fasteners displayed on an interactive touch display board, a computer screen, or the like. The HMIs may interact with many different UAVs such that the photogrammetry surveying system is scalable. The HMIs may also be used for feature map management. The HMIs may also visually indicate features that do not meet manufacturing specifications and should be reworked.

The remote computing devices are back-end computing devices linked to the master computing device and may be desktop computers, servers, mainframes, data repositories, and the like. The remote computing devices may store and analyze data collected by the tracking subsystem and the client computing devices.

In use, the photogrammetry surveying system provides fully autonomous feature inspection. Use of the photogrammetry surveying system is described in terms of airframe fastener head height inspection, but the photogrammetry surveying system may be used for inspecting other aircraft features and monitoring other aspects of aircraft fabrication.

First, the cameras of the tracking subsystem are positioned near the airframe and calibrated. For example, the cameras may be installed directly onto scaffolding surrounding the airframe.

A calibration routine and an inspection routine (including an inspection route and a photogrammetry scheme) is then generated. The calibration routine and inspection routine may each be a series of computer numeric control (CNC) G-Code instructions or similar coded instructions. For example, the CNC G-Code may be generated via user input into G-Code creation software, which may include a graphical user interface (GUI) that allows the user to intuitively create waypoints, flight segments, photogrammetry tasks (e.g., to take a specified number of photographs at particular locations or focusing on particular features), and the like without manually typing G-Code values. Alternatively, any one or part of the calibration routine and inspection routine (including inspection route and photogrammetry scheme) may be manually controlled.

The UAV then takes off from its charging station or home location. This may be automatic in response to a received instruction to begin the calibration routine and/or inspection routine.

The UAV and/or photogrammetry camera are then calibrated according to the calibration routine. This may include performing a series of flight maneuvers configured to make initial determinations of a position and velocity of the UAV and to set various default values.

The UAV then flies the inspection route or may fly a route generated in real time. For example, the UAV may fly a rectangular pattern around the aircraft.

The photogrammetry camera is then activated to capture photogrammetry data/images of the features according to the photogrammetry scheme. This may include taking a series of images of features being inspected. Measurements of the features (or characteristics of the features) may also be determined based on the images.

The tracking subsystem determines a position and orientation of the UAV relative to the airframe when the photogrammetry camera is activated. Specifically, the tracking subsystem detects the tracking targets on the UAV via the tracking cameras. The tracking subsystem also determines a position of the airframe to set an aircraft coordinate system. In this way, photogrammetry surveying system determines positions of the features relative to the airframe (via the position and orientation of the UAV) so that the positions of the features can be expressed according to the aircraft coordinate reference frame of the airframe.

The UAV then processes and/or stores the captured data. The position and orientation of the features may also be added to a feature map via one of the computing devices.

Features found to be non-compliant may then be reworked. For example, non-compliant fasteners may be adjusted until compliant or replaced with compliant fasteners.

The photogrammetry surveying system provides several advantages. In addition to many of the advantages provided by the feature inspection system described above, the tracking subsystem provides flight control feedback for autonomous flight of the UAV. Specifically, the UAV is configured to maneuver according to a position of the UAV as determined by the tracking subsystem. Meanwhile, photogrammetry data is associated with the position of the UAV as determined by the tracking subsystem.

The photogrammetry surveying system is also able to perform inspections with a reduction of surveying cycle time, more consistent and repeatable surveying without operator-induced variation and error, improved safety, and better image capture optimization with improved accuracy. The photogrammetry surveying system requires minimal infrastructure investment compared to conventional robotic manipulators and gantry systems. The photogrammetry surveying system provides rapid deployment for root cause corrective action (RCCA) and process monitoring.

Furthermore, the calibration routine and inspection routine may each be a series of computer numeric control (CNC) G-Code instructions or similar coded instructions, which facilitates user familiarity and accessibility. The CNC G-Code may be generated via user input into G-Code creation software, which may include a graphical user interface (GUI) that allows the user to intuitively create waypoints, flight segments, photogrammetry tasks, and the like without manually typing G-Code values.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
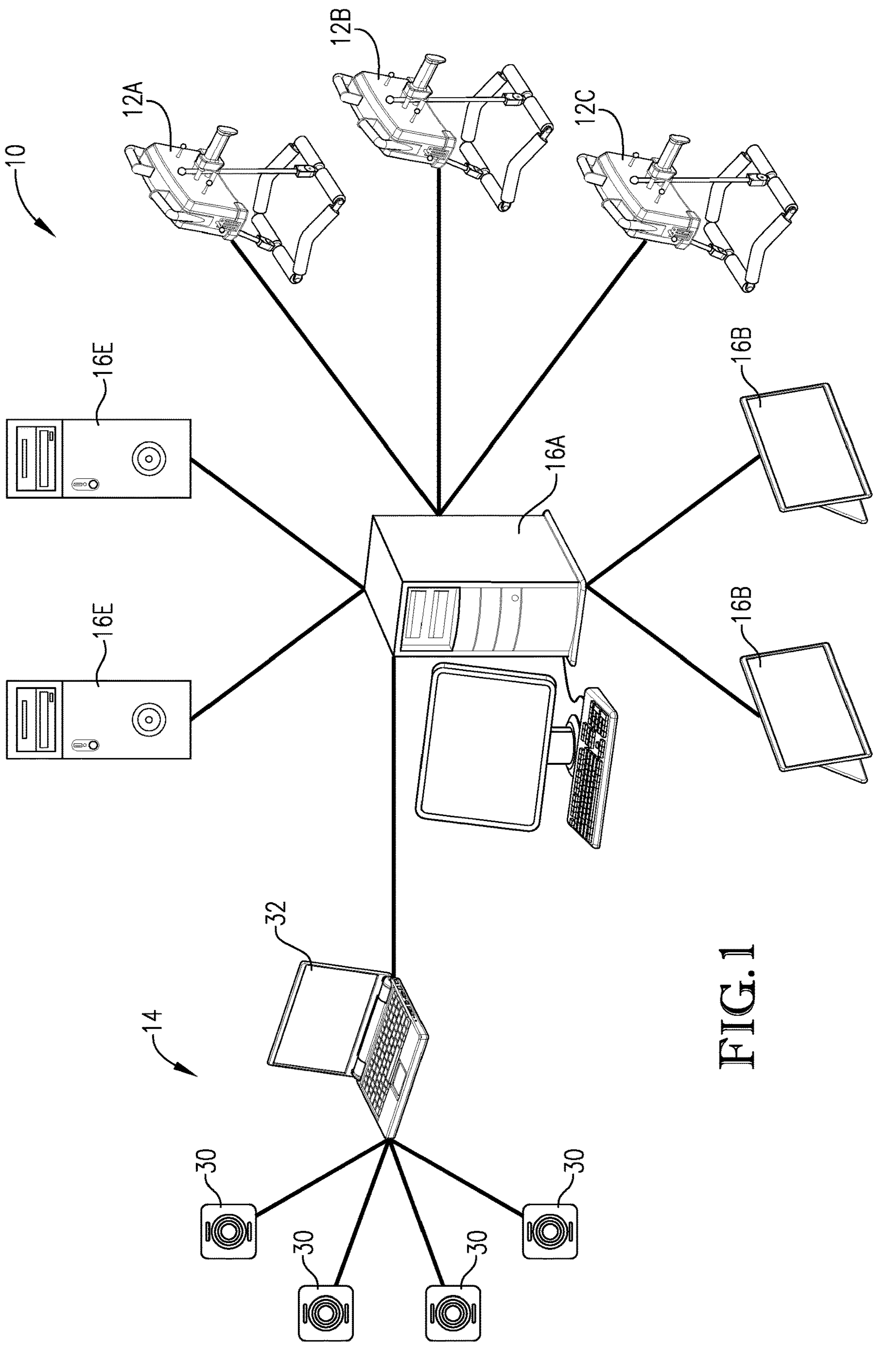
FIG. 1 is a schematic diagram of a feature inspection system constructed in accordance with an embodiment of the invention.
Figure 2:
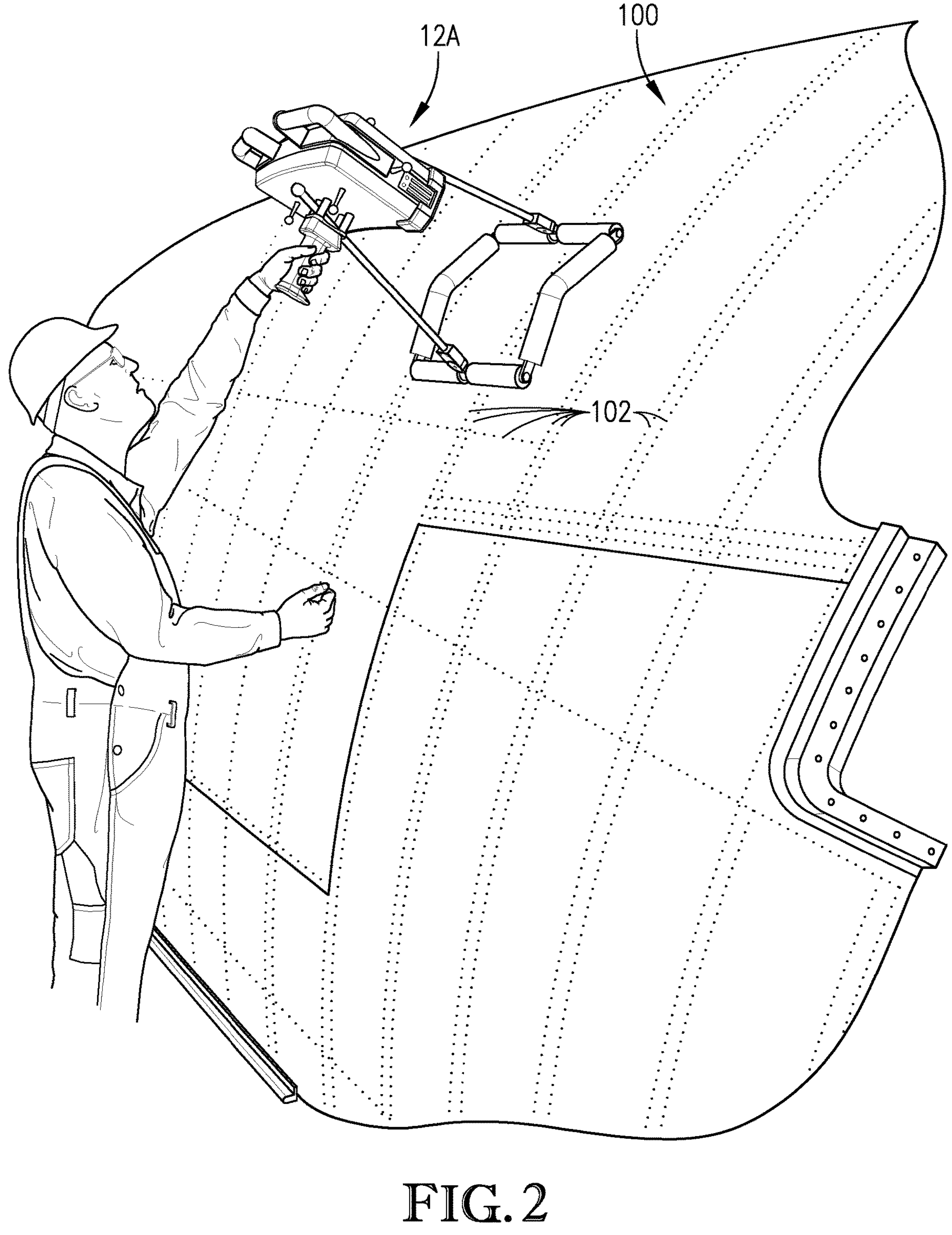
FIG. 2 is an environmental view of a feature inspection device of the feature inspection system of FIG. 1 being used on an airframe.
Figure 3:
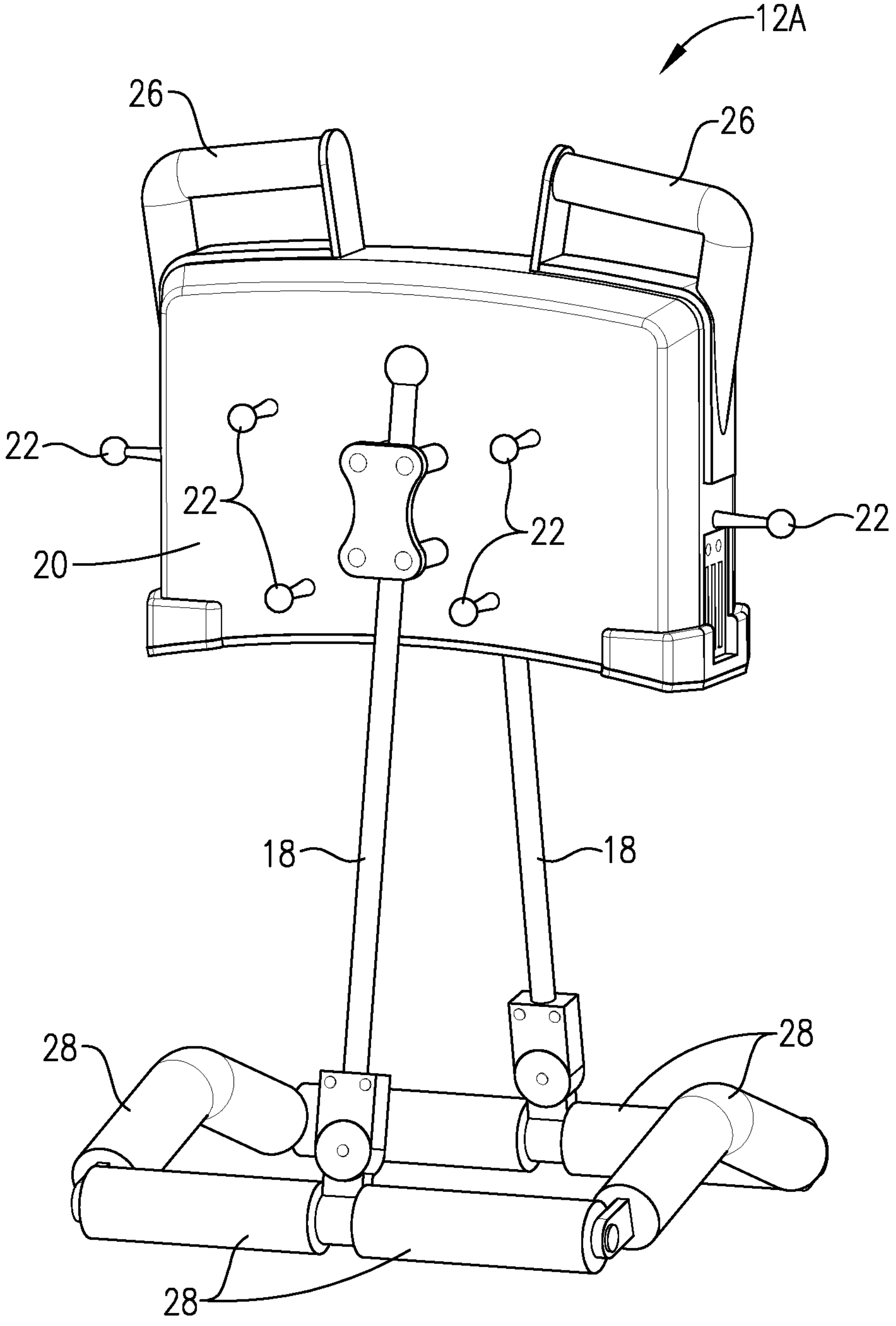
FIG. 3 is an enlarged perspective view of the feature inspection device of FIG. 2.
Figure 4:
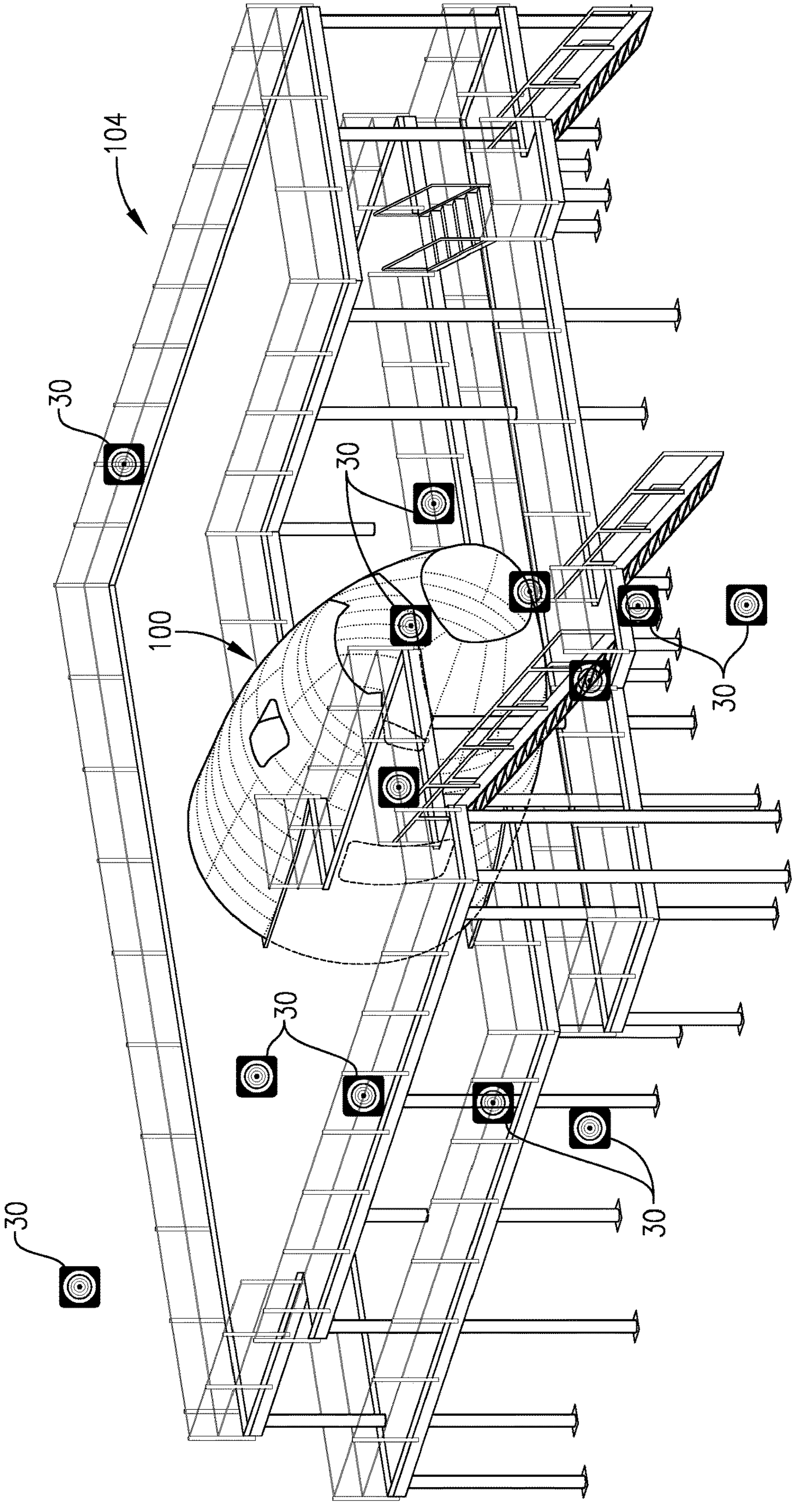
FIG. 4 is an environmental view of certain components of the feature inspection system of FIG. 1.
Figure 5:
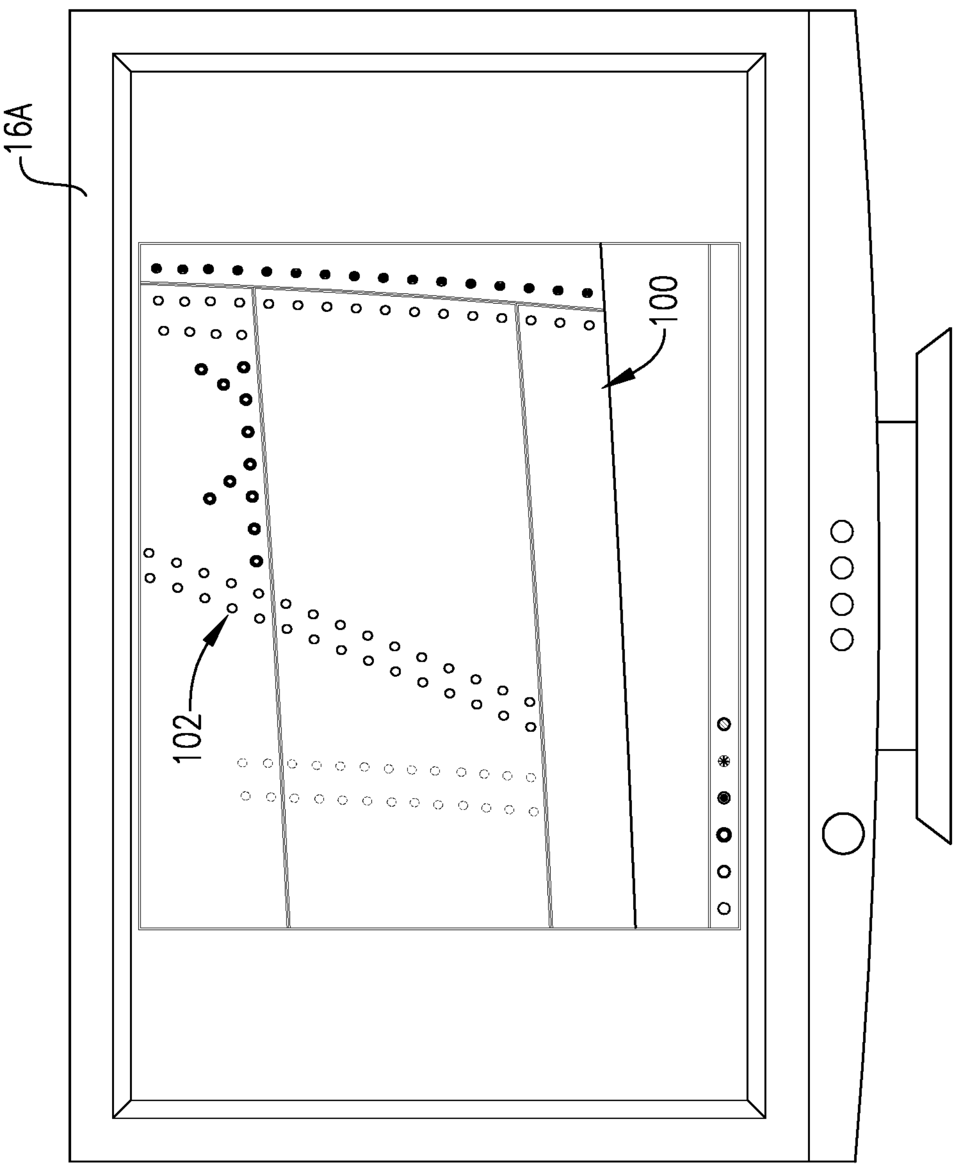
FIG. 5 is a screen view of a graphical user interface of the feature inspection system of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to FIGS. 1-5, a feature inspection system 10 constructed in accordance with an embodiment of the invention is illustrated. The feature inspection system 10 is described in terms of airframe fastener head height inspection, but the feature inspection system 10 may be used for inspecting other aircraft features and monitoring other aspects of aircraft fabrication.

The feature inspection system 10 broadly comprises a plurality of feature inspection devices 12A-C, a tracking subsystem 14, and a plurality of computing devices 16A-E. The feature inspection system 10 may include additional inspection devices, tracking components, and computing devices so that the feature inspection system 10 is scalable, replicable, and adaptable to various airframe fabrication programs and other construction programs.

The feature inspection devices 12A-C are substantially similar so only feature inspection device 12A will be described in detail. Feature inspection device 12A includes a frame 18, a scanner 20, a plurality of tracking targets 22, and an augmented reality projector. Feature inspection device 12A may be an 8tree® brand scanning device, an OTIS scanning device, a LOTIS scanning device, a depth indicator, an isoscope, or any other suitable scanning device.

The frame 18 may include handles 26 and contact pads 28. The frame 18 spaces the scanner 20 from the airframe 100 so that targeted fasteners 102 are in range of the scanner 20.

The handles 26 may include suitcase grips, a pistol grip, or any other suitable grasping features. The handles 26 allow the user to position the feature inspection device 12A against the airframe 100 and hold the feature inspection device 12A in position while the scanner 20 scans the fasteners 102.

The contact pads 28 contact the airframe 100 without scratching or damaging the airframe 100. To that end, the contact pads 28 may be a resilient rubber, felt, or any other suitable materials. On the other hand, the contact pads 28 are rigid enough for the scanner 20 to generate accurate readings.

The scanner 20 may be a three-dimensional surface inspection sensor, a camera, an optical sensor, or any other suitable scanning component. The scanner 20 may be contactless or may be a tactile sensor.

The tracking targets 22 may be passive or active targets positioned on the frame 18 or any other suitable detectable elements. The tracking targets 22 provide reference points for determining a position and orientation of the feature inspection device 12A.

The augmented reality projector may include user inputs, a touchscreen, a display, status indicators, and the like. The augmented reality projector provides scanning readouts, alignment information, feature data, and other information to the user. The augmented reality projector may display the above information on the airframe 100.

The tracking subsystem 14 includes a plurality of cameras 30 and a tracking computer 32. The tracking subsystem 14 ensures tracking of the feature inspection device 12A (and hence the fasteners 102) relative to an aircraft coordinate system that moves with the airframe 100. The tracking subsystem 14 may use OptiTrack, ART, or Vicon system, or any other suitable three-dimensional positional tracking system.

The cameras 30 are spaced apart from each other near the airframe 100. The cameras 30 may be placed in several locations near the airframe 100 on scaffolding 104 so that the feature inspection device 12A is in view of at least one of the cameras 30. The cameras 30 may have protective housings and mounts to avoid accidentally disturbing the cameras 30. The cameras 30 provide information about the position and orientation of the feature inspection device 12A and the airframe 100.

The tracking computer 32 may include a processor, a memory, user inputs, a display, and the like. The tracking computer 32 may also include circuit boards and/or other electronic components such as a transceiver or external connection for communicating with other computing devices of the feature inspection system 10. The tracking computer 32 determines the position and orientation of the feature inspection device 12A and the airframe 100 via the cameras 30.

The tracking subsystem 14 may be a macro area precision position system (MAPPS) camera network system and may be compatible with cross measurement from other metrology devices. MAPPS achieves precise positional tracking of objects in a dynamic space in real time via a plurality of cameras such as cameras 30. The tracking subsystem 14 uses retroreflective targets (such as tracking targets 22) and markers that can be interchanged with shank target mounts utilized in many tooling and floor-mounted assembly jigs. Photogrammetry surveys of visible targets enables rigid body creation and motion tracking with aligned point sets coming from tooling reference locations.

The computing devices 16A-E include a master computing device 16A, a plurality of client computing devices 16B,C, and a plurality of remote/networked computing devices 16D,E. The computing devices 16A-E may be connected to each other via a wired or wireless communication network.

The master computing device 16A may include a processor, a memory, a plurality of inputs, and a display. The master computing device 16A may also include circuit boards and/or other electronic components such as a transceiver or external connection for communicating with external computing systems.

The processor may implement aspects of the present invention with one or more computer programs stored in or on computer-readable medium residing on or accessible by the processor. Each computer program preferably comprises an ordered listing of executable instructions for implementing logical functions in the processor. Each computer program can be embodied in any non-transitory computer-readable medium, such as the memory (described below), for use by or in connection with an instruction execution system, apparatus, or device, such as a computer-based system, processor-containing system, or other system that can fetch the instructions from the instruction execution system, apparatus, or device, and execute the instructions.

The memory may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The inputs may comprise a keyboard, mouse, trackball, touchscreen, buttons, dials, virtual inputs, and/or a virtual reality simulator. The inputs allow a user to activate and control components of the feature inspection system 10.

The display may present virtual inputs, data spreadsheets and data tables, graphical data representations, computer models of the airframe 100, fastener maps, and other information. The display may be a touchscreen, an LCD screen, an LED screen, and the like.

The client computing devices 16B,C are front-end computing devices linked to the master computing device 16A and may be desktop computers, laptop computers, tablets, handheld computing devices, kiosks, and the like. The client computing devices 16B,C may include human machine interfaces HMIs used directly by inspectors for inputting data into and reviewing data from the feature inspection system 10. For example, the HMIs may be a graphical representation of the airframe 100 including the fasteners 102 displayed on an interactive touch display board, a computer screen, or the like. The HMIs may interact with many different feature inspection devices 12A-C and work cells such that the feature inspection system 10 is scalable. The HMIs may also be used for fastener map management. The HMIs may also visually indicate features that do not meet manufacturing specifications and should be reworked.

The remote computing devices 16D,E are back-end computing devices linked to the master computing device and may be desktop computers, servers, mainframes, data repositories, and the like. The remote computing devices 16D,E may store and analyze data collected by the tracking subsystem 14 and the client computing devices 16D,E.

Figure 6:
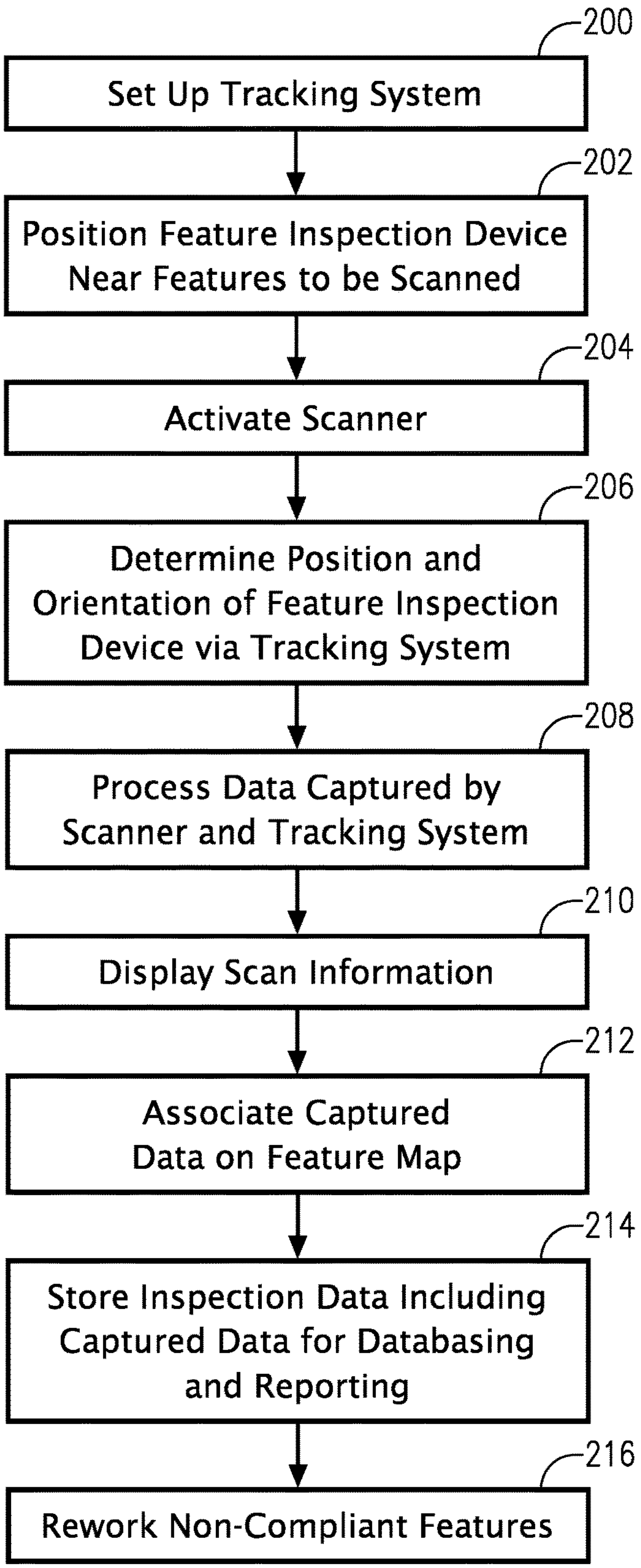
FIG. 6 is a flow diagram of method steps for inspecting features via the feature inspection system of FIG. 1 in accordance with an embodiment of the invention.
Figure 7:
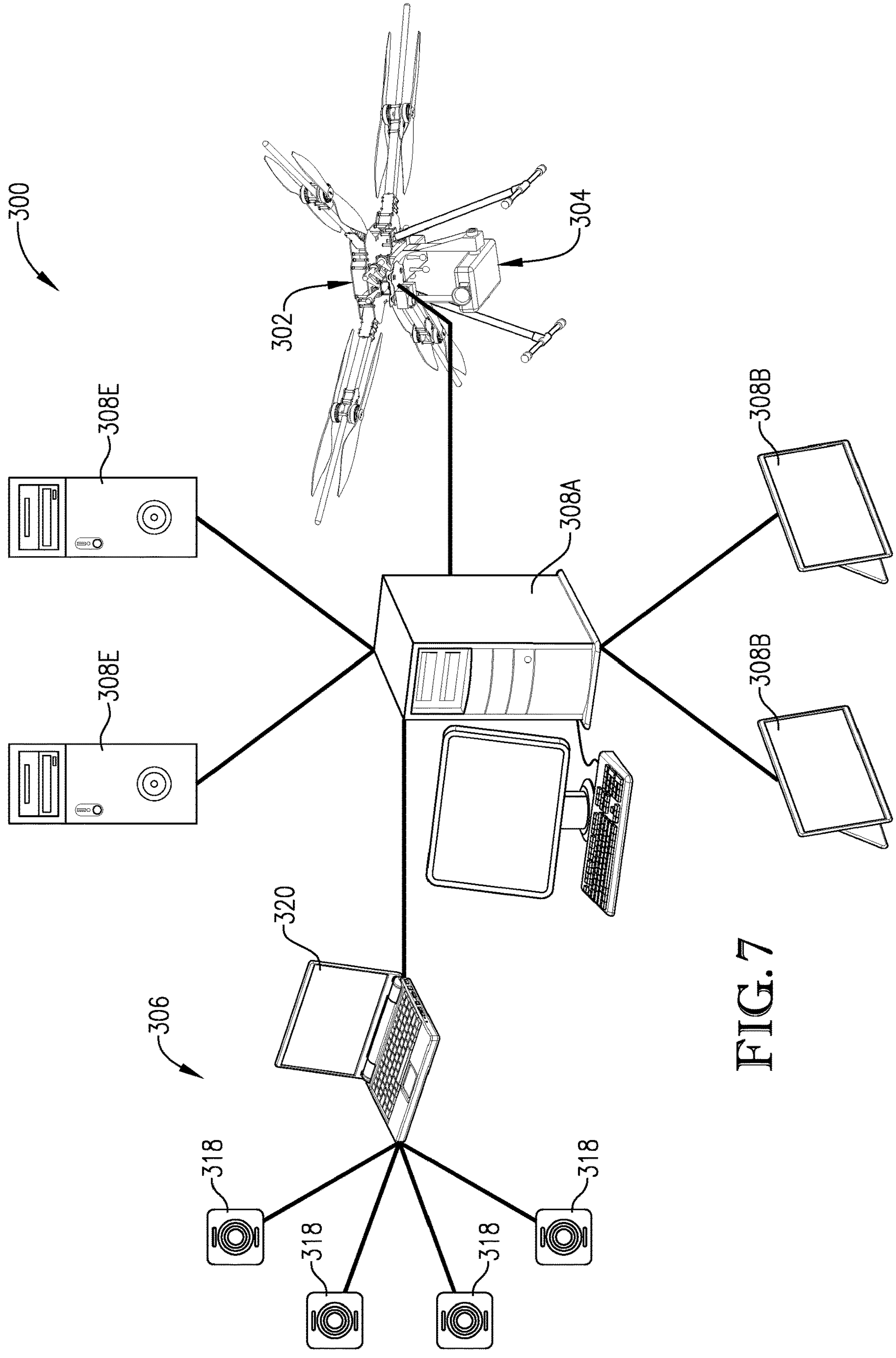
FIG. 7 is a schematic diagram of a photogrammetry surveying system constructed in accordance with an embodiment of the invention.
Figure 8:
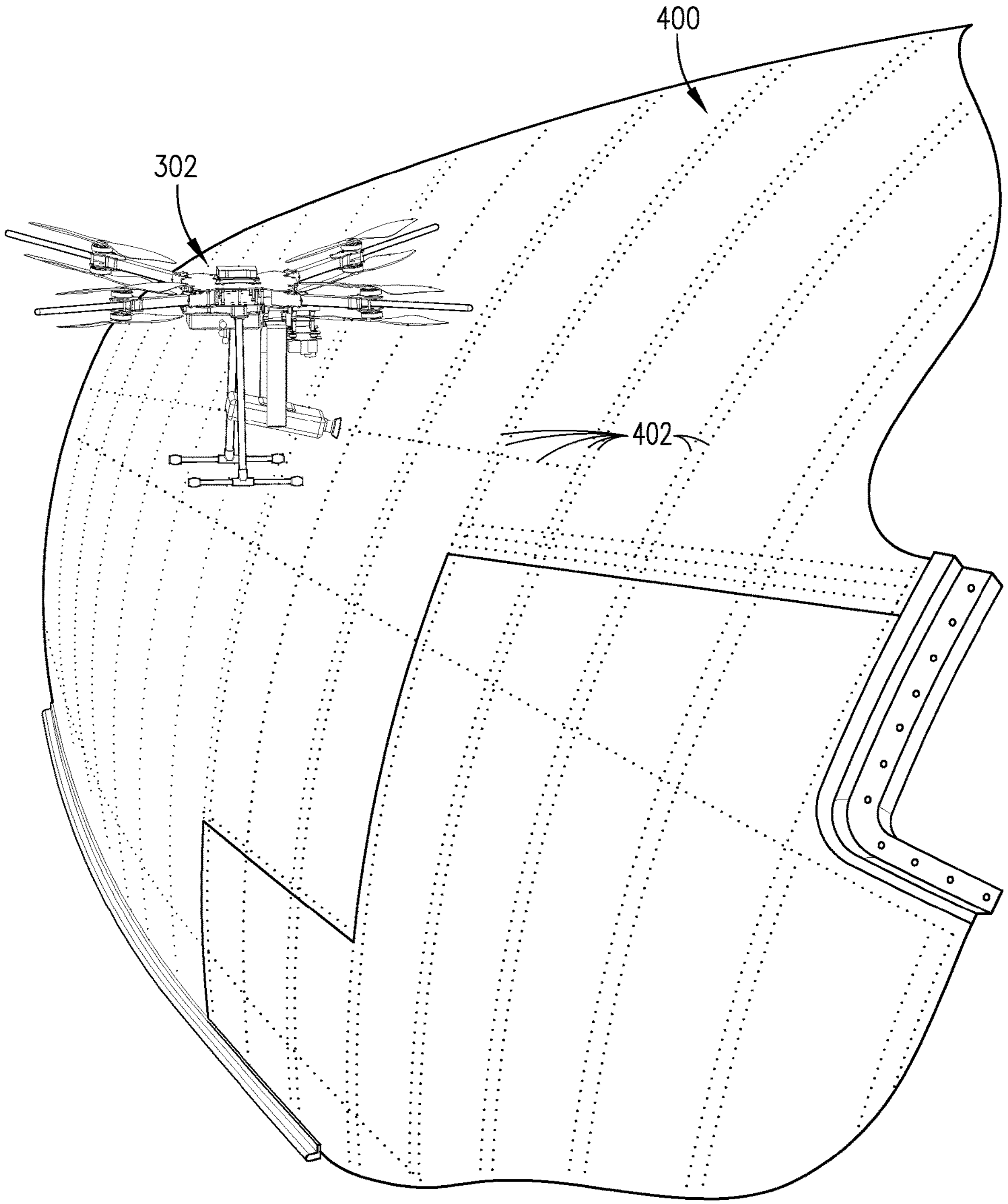
FIG. 8 is an environmental view of a UAV of the photogrammetry surveying system of FIG. 7 inspecting an airframe.
Figure 9:
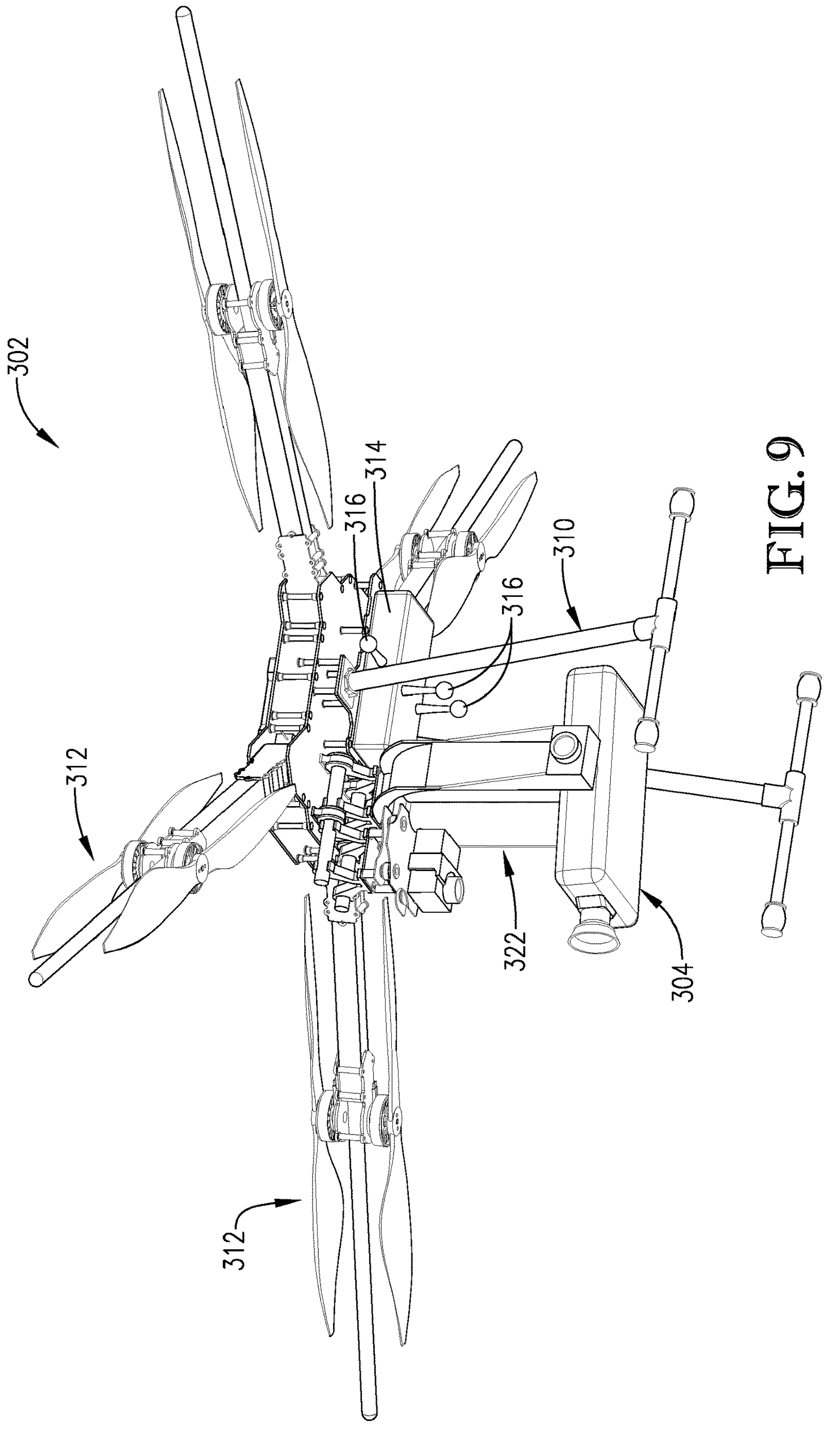
FIG. 9 is an enlarged perspective view of the UAV of FIG. 8.
Figure 10:
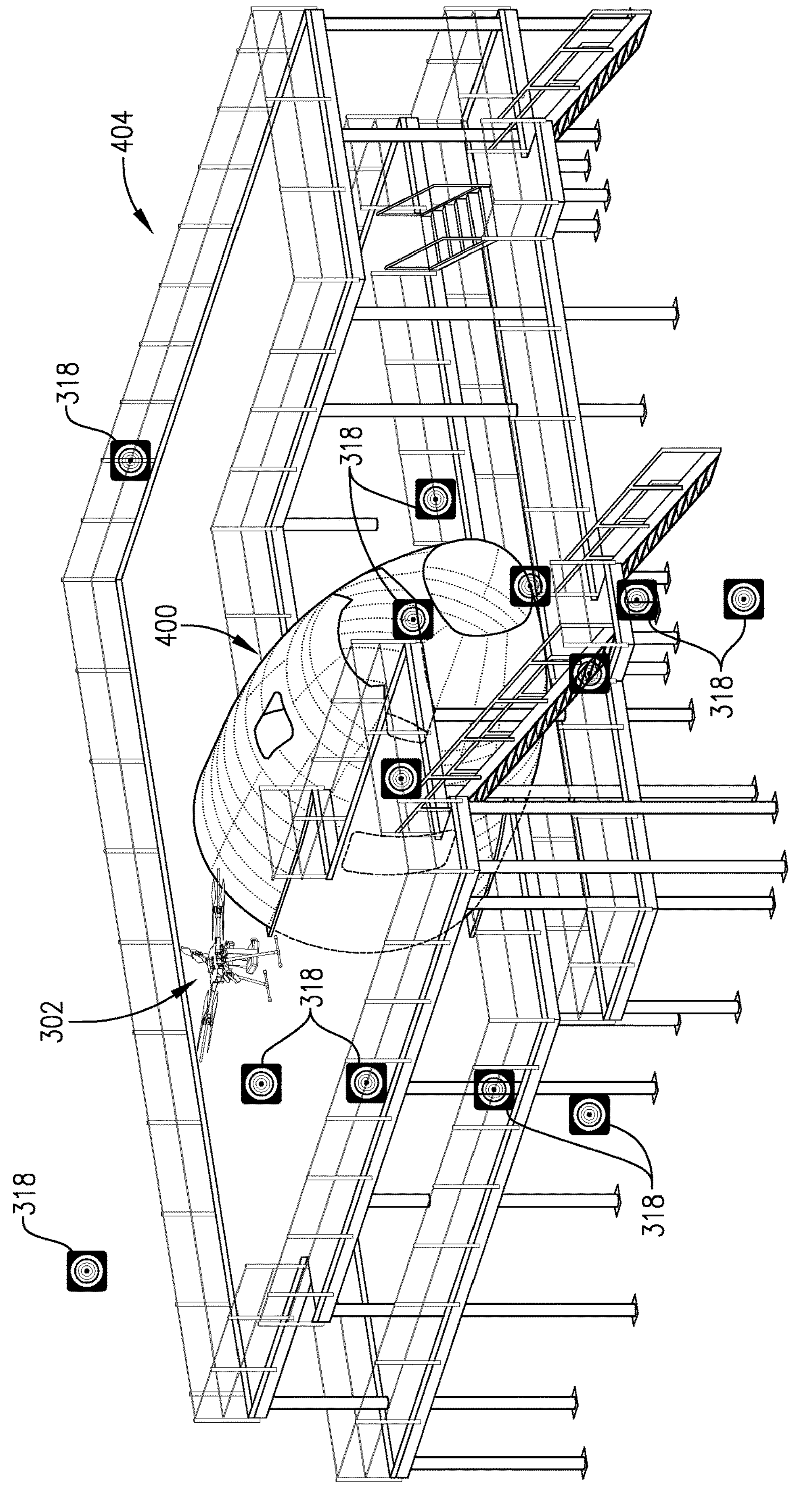
FIG. 10 is an environmental view of certain components of the photogrammetry surveying system of FIG. 7.

Turning to FIG. 6, use of the feature inspection system 10 will now be described in more detail. First, the cameras 30 of the tracking subsystem 14 may be positioned near the airframe 100 and calibrated, as shown in block 200. For example, the cameras 30 may be installed directly onto scaffolding surrounding the airframe 100. The cameras 30 may be rigidly constrained for reliable data acquisition. To that end, the cameras 30 may be clamped, mounted, or magnetically held to the scaffolding. Unprotected cameras risk being bumped and/or moved by workers passing through the work environment.

The feature inspection device 12A may then be positioned against the airframe 100 such that a set of features (or a single feature) is in range and/or framed by the scanner 20, as shown in block 202. To that end, the contact pads 28 of the frame 18 may contact the airframe 100 such that the scanner 20 faces the features. The feature inspection device 12A should be in sight of a maximum number, and at least one, of the cameras 30.

The scanner 20 may then be activated so that the scanner 20 captures data or imagery of the features, as shown in block 204. In one embodiment, the scanner 20 obtains a scan image and a raw image of the fasteners. The scanner 20 may need to be held steady for approximately two seconds during data capture. The feature inspection device 12A may indicate a quality of the scan of the features so that they may be rescanned if the scan is poor.

The tracking subsystem 14 determines a position and orientation of the feature inspection device 12A relative to the airframe 100 when the scanner 20 is activated, as shown in block 206. Specifically, the tracking subsystem 14 detects the tracking targets 22 on the feature inspection device 12A via the cameras 30. The tracking subsystem 14 also determines a position of the airframe 100 to set an aircraft coordinate system. In this way, the system 10 determines positions of the features relative to the airframe 100 (via the position and orientation of the feature inspection device 12A) so that the positions of the features can be expressed according to the aircraft coordinate reference frame of the airframe 100.

The feature inspection device 12A or one of the computing devices 16A-E may then process and/or store the captured data, as shown in block 208. This may be completed virtually instantaneously or at most within five seconds from activating the scanner 20. In one embodiment, up to thirty fastener head heights may be scanned. Storing a raw image of the fasteners may be useful if there is relevant text or visual information on inspection tape or the TPC pertinent to the inspected fasteners.

The augmented reality projector may then display or project onto the airframe 100 information regarding the current scan, as shown in block 210. For example, the augmented reality projector may indicate which features have been scanned and may present measurement results of the scan. Alternatively, another interface may display the information regarding the current scan.

In this way, the augmented reality projector (or another interface) enables real time feedback to the tracking and logging of fastener positions and orientations in the aircraft coordinate reference frame. Specifically, the augmented reality projector displays the real time positions and/or orientations of the feature inspection device 12A (and hence the scanner 20) and the measured fasteners for the user's review. The augmented reality projector allows the user to query the fastener head measurement results. If one of the measurements is erroneous, the user may delete the erroneous measurement and/or the entire scan.

The position and orientation of the fasteners may be added to a fastener map (or more generally, a feature map) via one of the computing devices 16A-E, as shown in block 212. Fastener maps are a list of all fasteners on an airframe with their respective locations in the airframe and associated engineering specifications. Which allows for matching scanned fasteners to associated engineering specifications and determining if a fastener's flushness is within acceptable tolerance. Fastener maps also allow for updating engineering specifications to reflect engineering changes in fastener locations and specifications. If a fastener map does not exist, the feature inspection system 10 can be used to reverse engineer fastener locations and create a fastener map that the feature inspection system 10 can use for fastener inspection and tracking.

Engineering data may be loaded for multiple fastener map contexts. The fastener map contexts are tracked and any data requests are routed to the appropriate fastener instance. Fastener maps allow for a reference engineering defined fastener to be matched to a set of coordinates in space from scan data. Fastener maps also provide auxiliary services such as obtaining a spreadsheet of all fasteners, fastener count, and other data.

Fastener maps may include a computer model with virtual representations of an aircraft skin and its fasteners. The computer model enables a user to easily visualize fasteners, fastener locations, and information about the fasteners such as fastener types and tolerances. The feature inspection system 10 may use this information for cross referencing scanned results. Fastener maps may be interactive such that information about a fastener may be viewed upon clicking, touching, or otherwise selecting the fastener's virtual representation. Head height measurement data and other measurement data may be associated with the fasteners in the fastener map. This data may be reviewed in the fastener map via one of the HMIs or one of the client computing devices 16B,C. Color schemes may be used to indicate acceptable fasteners versus unacceptable fasteners. Final scanning and tracking results from the feature inspection device 12A may be stored via the remote computing devices 16D,E, as shown in block 214. The remote computing devices 16D,E provide permanent enterprise databasing of the measurement results and generation of static reports per each line unit.

Fasteners found to be non-compliant may then be reworked, as shown in block 216. For example, non-compliant fasteners may be adjusted until compliant or replaced with compliant fasteners.

The feature inspection system 10 provides several advantages. For example, the feature inspection system 10 automates airframe feature inspection. In one embodiment, the feature inspection system 10 provides real time, continuous, precision measurement and recording of fastener head heights and independently determines fastener positions and orientations in an aircraft coordinate reference frame. Inspected fastener identification data, measurement data, and positions and orientations of fasteners on the airframe can be digitally logged for fastener reworking during manufacturing and for recordkeeping throughout the life of the aircraft.

The feature inspection system 10 generates automated intelligent rework plans that do minimal damage and are achieved at minimal cost to achieve a conforming product. The feature inspection system 10 performs analytical studies to predict and determine areas of concerns before issues occur. For example, the feature inspection system 10 may analyze measurements and positions of the features to determine trends of non-conformance.

Scanned features are automatically associated to their nominal engineering definition in a feature map. Feature measurement results can be reviewed at any time during scanning. All historical line units are reviewable for root cause corrective action and process improvement development.

The feature inspection system 10 can be used with different inspection devices besides feature inspection devices 12A-C. The cameras 30 ensure measurements and position/orientation data can be obtained any place around the entire airframe. The feature inspection system 10 scales well for the number and type of feature inspections involved in aircraft production and the number of inspectors using the feature inspection system 10.

The feature inspection system 10 uses photogrammetry motion tracking to achieve high level three-dimensional indoor feature position and orientation mapping and aircraft skin quality defect locations in a factory environment. The photogrammetry motion tracking may use existing tooling ball locators that exist on all FAJs and tools for aerospace manufacturing for aligning tools and features into the aircraft coordinate reference frame. The feature inspection system 10 may combine photogrammetry motion tracking and traditional aerospace photogrammetry to create reference networks of tracked targets in the aircraft coordinate reference frame.

The feature inspection system 10 has a system architecture that allows any number of feature inspection devices, any number of user interfaces, and any number of aircraft products to all be tracked and seamlessly integrated with any number of photogrammetry tracking systems. That is, the system architecture allows the number of user interfaces, the number of feature inspection devices, and the number of tracked aircraft sub-assemblies to be independent from each other. The system architecture may be built on a modular programming architecture that makes the feature inspection system 10 highly modular for alternate scanners and applications and streamlines the integration of fully automated robotic or cobot based applications.

The system architecture accommodates many different types of measurement devices including 8tree® brand scanners, optical topographic inspection system (OTIS) described in US patent application publication number US-2018-0259461, LED optical topographic inspection systems such as LOTIS, depth indicators, and isoscopes. The system architecture also enables tracking non-measurement fabrication tools (and aspects thereof) such as drills, torque guns, riveting guns, hand sanders, DA sanders, and the like. For example, the feature inspection system 10 may determine a position, an orientation, an output, and other data of a fabrication tool when the fabrication tool is used. The feature inspection system 10 may analyze the above data to determine trends of non-conforming usage of the fabrication tool and correlation/causation of mechanic behavior and non-conforming product in a sustained continuous real-time production environment.

The feature inspection devices 12A-C achieve repeatability with sufficient measurement results and cycle times for use during production. The feature inspection devices 12A-C achieve reliable tracking in a factory environment via photogrammetry motion tracking with settings and output conditioned to achieve accurate and repeatable measurements conforming to inspection requirements. Real-time tracking of the motion capture cameras 30 provide extended reality feedback for displaying scanned results and work instructions.

Turning to FIGS. 7-10, a photogrammetry surveying system 300 constructed in accordance with an embodiment of the invention is illustrated. The photogrammetry surveying system 300 utilizes tracking feedback to integrate autonomous flight with photogrammetry.

The photogrammetry surveying system 300 broadly comprises an unmanned aerial vehicle (UAV) 302, a photogrammetry camera 304, a tracking subsystem 306, and a plurality of computing devices 308A-E. The photogrammetry surveying system 300 may include additional unmanned aerial vehicles, photogrammetry cameras, tracking components, inspection devices, and computing devices so that the photogrammetry surveying system 300 is scalable, replicable, and adaptable to various airframe fabrication programs and other construction programs.

The UAV 302 includes a frame 310, a plurality of rotors 312, a power supply 314, a plurality of tracking targets 316, and an on-board controller. The UAV 302 may be autonomous, semi-autonomous, or remotely controlled. The UAV 302 may be a quadcopter or similar device. Example UAVs include a Cinema X8 model and Flamewheel S500 model. The UAV 302 may be capable of flying in outdoor environments, enclosed areas, or areas that have outdoor and indoor characteristics.

The frame 310 supports the rotors 312, power supply 314, tracking targets 316, on-board controller, and photogrammetry camera 304. The frame 310 may include a skid, landing gear, legs, or the like for non-flight support and a connector for docking the UAV 302 with a home base or charger.

The power supply 314 may be a rechargeable battery or may be a tethered power cable. The rechargeable battery should carry a charge long enough to complete one or several inspections and may be recharged at a charging landing pad. A tethered power cable may allow infinite flight time but limited flight range.

The tracking targets 316 may be passive or active targets or any other suitable detectable elements positioned on the frame 310. The tracking targets 316 provide reference points for determining a position and orientation of the UAV 302.

The on-board controller dictates movement and actions of the UAV 302 and optionally of the photogrammetry camera 304 and may include a processor, a memory, and other computing elements such as circuit boards and a transceiver or external connection for communicating with external computing systems.

The on-board controller may implement aspects of the present invention with one or more computer programs stored in or on computer-readable medium residing on or accessible by the processor. Each computer program preferably comprises an ordered listing of executable instructions for implementing logical functions in the processor. Each computer program can be embodied in any non-transitory computer-readable medium, such as the memory (described below), for use by or in connection with an instruction execution system, apparatus, or device, such as a computer-based system, processor-containing system, or other system that can fetch the instructions from the instruction execution system, apparatus, or device, and execute the instructions. The on-board controller may include PixHawk flight control or similar flight control.

The memory may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The photogrammetry camera 304 is configured to generate a series of images of a single object or feature for performing 3D measurements. The photogrammetry camera 304 may have high precision with accuracy of a few thousandths of an inch. The photogrammetry camera 304 may be mounted to the UAV 302 via a gimbal 322. In one embodiment, the gimbal 322 is a Gremsy H16 Gimbal from xFold. In one embodiment, the photogrammetry camera 304 is a GSI INCA 4 camera.

The tracking subsystem 306 includes a plurality of tracking cameras 318 and a tracking computer 320. The tracking subsystem 306 ensures tracking of the UAV 302 (and hence the features 402 being inspected) relative to an aircraft coordinate system that moves with an airframe 400. The tracking subsystem 306 may use OptiTrack, ART, or Vicon system, or any other suitable three-dimensional positional tracking system.

The tracking cameras 318 are spaced apart from each other near the airframe 400. The tracking cameras 318 may be placed in several locations near the airframe 400 on scaffolding 404 so that the UAV 302 is in view of at least one of the tracking cameras 318. The tracking cameras 318 may have protective housings and mounts to avoid accidentally disturbing the tracking cameras 318. The tracking cameras 318 provide information about the position and orientation of the UAV 302 and the airframe 400.

The tracking computer 320 may include a processor, a memory, user inputs, a display, and the like. The tracking computer 320 may also include circuit boards and/or other electronic components such as a transceiver or external connection for communicating with other computing devices of the photogrammetry surveying system 300. The tracking computer 320 determines the position and orientation of the UAV 302 and the airframe 400 via the tracking cameras 318.

The tracking subsystem 306 may be a macro area precision position system (MAPPS) camera network system and may be compatible with cross measurement from other metrology devices. MAPPS achieves precise positional tracking of objects in a dynamic space in real time via a plurality of cameras such as tracking cameras 318. The tracking subsystem 306 provides autonomous feedback to the on-board controller of the UAV 302. The tracking subsystem 306 uses retroreflective targets (such as tracking targets 316) and markers that can be interchanged with shank target mounts utilized in many tooling and floor-mounted assembly jigs. Photogrammetry surveys of visible targets enables rigid body creation and motion tracking with aligned point sets coming from tooling reference locations.

The computing devices 308A-E include a master computing device 308A, a plurality of client computing devices 308B,C, and a plurality of remote/networked computing devices 308D,E. The computing devices 308A-E may be connected to each other via a wired or wireless communication network.

The master computing device 308A may include a processor, a memory, a plurality of inputs, and a display. The master computing device 308A may also include circuit boards and/or other electronic components such as a transceiver or external connection for communicating with external computing systems.

The processor may implement aspects of the present invention with one or more computer programs stored in or on computer-readable medium residing on or accessible by the processor. Each computer program preferably comprises an ordered listing of executable instructions for implementing logical functions in the processor. Each computer program can be embodied in any non-transitory computer-readable medium, such as the memory (described below), for use by or in connection with an instruction execution system, apparatus, or device, such as a computer-based system, processor-containing system, or other system that can fetch the instructions from the instruction execution system, apparatus, or device, and execute the instructions.

The memory may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The inputs may comprise a keyboard, mouse, trackball, touchscreen, buttons, dials, virtual inputs, and/or a virtual reality simulator. The inputs allow a user to activate and control components of the photogrammetry surveying system 300.

The display may present virtual inputs, data spreadsheets and data tables, graphical data representations, computer models of the airframe 100, fastener maps, and other information. The display may be a touchscreen, an LCD screen, an LED screen, and the like.

The client computing devices 308B,C are front-end computing devices linked to the master computing device 308A and may be desktop computers, laptop computers, tablets, handheld computing devices, kiosks, and the like. The client computing devices 308B,C may include human machine interfaces HMIs used directly by inspectors for inputting data into and reviewing data from the photogrammetry surveying system 300. For example, the HMIs may be a graphical representation of the airframe 400 including fasteners 402 displayed on an interactive touch display board, a computer screen, or the like. The HMIs may interact with many different UAVs such that the photogrammetry surveying system 300 is scalable. The HMIs may also be used for feature map management. The HMIs may also visually indicate features that do not meet manufacturing specifications and should be reworked.

The remote computing devices 308D,E are back-end computing devices linked to the master computing device 308A and may be desktop computers, servers, mainframes, data repositories, and the like. The remote computing devices 308D,E may store and analyze data collected by the tracking subsystem 306 and the client computing devices 308D,E.

Figure 11:
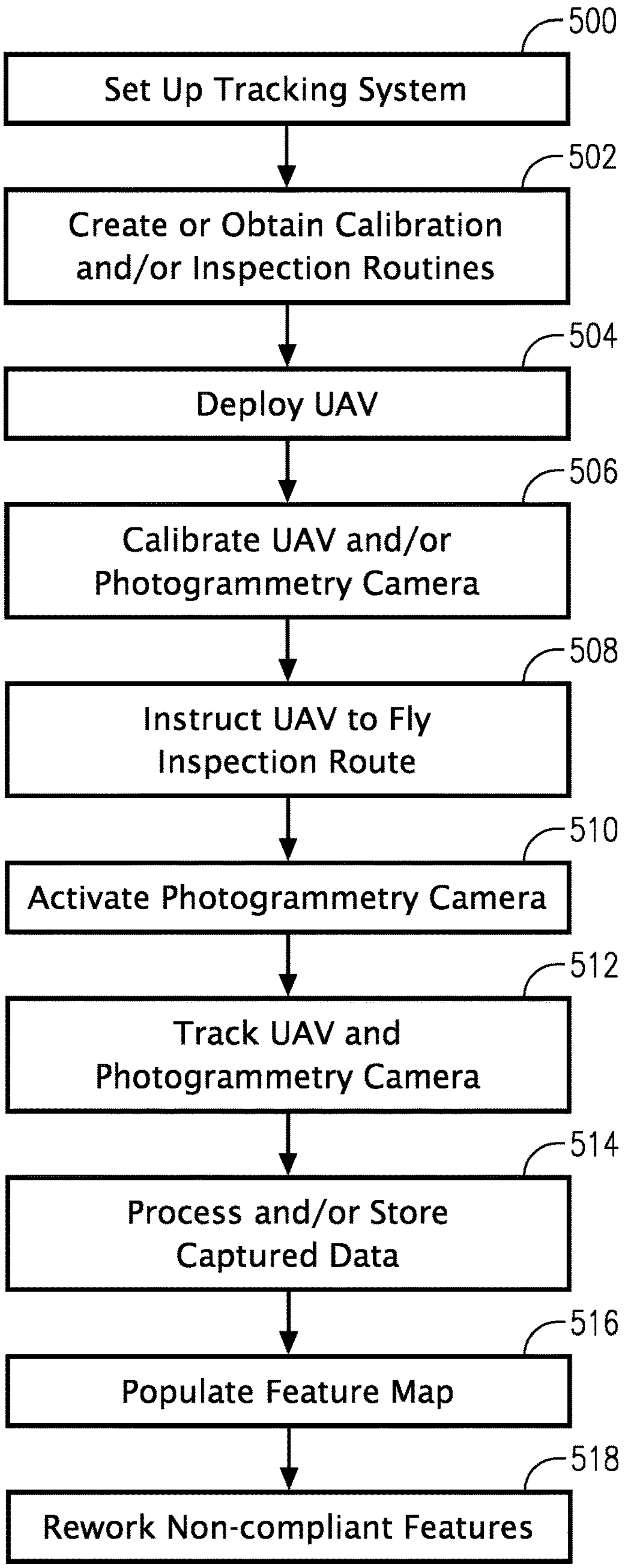
FIG. 11 is a flow diagram of method steps for inspecting features via the feature inspection system of FIG. 1 in accordance with an embodiment of the invention.

Turning to FIG. 11, use of the photogrammetry surveying system 300 will now be described in more detail. Use of the photogrammetry surveying system 300 is described in terms of airframe fastener head height inspection, but the photogrammetry surveying system 300 may be used for inspecting other aircraft features such as an aircraft surface, an aircraft skin, an aircraft fastener, a fuselage part, an edge of an aircraft part, an aircraft skin discontinuity, an aircraft skin dent, an aircraft skin gap, and an aircraft skin scratch, and aspects of aircraft features such as aircraft surface profile, aircraft skin quality, scratch depth, dent size, gap width, fastener height, fastener securement quality, fastener integrity, aircraft party integrity, aircraft defect size, aircraft defect quality, and aircraft defect type, and for monitoring other aspects of aircraft fabrication.

First, the cameras 320 of the tracking subsystem 306 may be positioned near the airframe 400 and calibrated, as shown in block 500. For example, the cameras 320 may be installed directly onto scaffolding surrounding the airframe 400. The cameras 320 may be rigidly constrained for reliable data acquisition. To that end, the cameras 320 may be clamped, mounted, or magnetically held to the scaffolding. Unprotected cameras risk being bumped and/or moved by workers passing through the work environment.

A calibration routine and an inspection routine (including an inspection route and a photogrammetry scheme) is then generated, as shown in block 502. The calibration routine and inspection routine may each be a series of computer numeric control (CNC) G-Code instructions or similar coded instructions. For example, the CNC G-Code may be generated via user input into G-Code creation software, which may include a graphical user interface (GUI) that allows the user to intuitively create waypoints, flight segments, photogrammetry tasks (e.g., to take a specified number of photographs at particular locations or focusing on particular features), and the like without manually typing G-Code values. Alternatively, any one or part of the calibration routine and inspection routine (including inspection route and photogrammetry scheme) may be manually controlled.

The UAV 302 may then take off from its charging station or home location, as shown in block 504. This may be automatic in response to a received instruction to begin the calibration routine and/or inspection routine.

The UAV 302 and/or photogrammetry camera 304 may then be calibrated according to the calibration routine, as shown in block 506. This may include performing a series of flight maneuvers configured to make initial determinations of a position and velocity of the UAV 302 and to set various default values. For example, excessive moves and pitches may be performed to set move and pitch rates. Calibration of the photogrammetry camera 304 may include taking a series of test photographs, locking onto a test target to set certain photogrammetry parameters, rolling the gimbal. Calibration may also involve determining environmental conditions such as facility airflow, lighting, and any other conditions that may affect the inspection routine. Calibration may also provide the opportunity to ensure all components are working properly. The UAV 302 may abort the calibration or inspection routine or make adjustments if it is determined a component is not working properly. In one embodiment, calibration is performed before the inspection routine is initiated.

The UAV 302 may then be instructed to fly the inspection route or may fly a route generated in real time, as shown in block 508. For example, the UAV 302 may fly a rectangular pattern around the aircraft 400.

The cameras 320 of the tracking subsystem 306 should be positioned to track the UAV 302 at all times and locations along the inspection route; however, if there is a lapse in tracking coverage, or if a route deviation is desired, a user can override the inspection route and take manual control of the UAV 302. Communication should be established throughout the inspection route between the on-board controller, tracking subsystem 306 (i.e., MAPPS), and certain computing devices 308A-E.

The photogrammetry camera 304 may then be activated to capture photogrammetry data/images of the features 402 according to the photogrammetry scheme, as shown in block 510. This may include taking a series of images of features being inspected. Measurements of the features (or characteristics of the features) may also be determined based on the images. The photogrammetry surveying system 300 may indicate a quality of the photogrammetry data/images so the features may be reinspected if necessary.

The tracking subsystem 306 determines a position and orientation of the UAV 302 relative to the airframe 400 when the photogrammetry camera 304 is activated, as shown in block 512. Specifically, the tracking subsystem 306 detects the tracking targets 316 on the UAV 302 via the tracking cameras 320. The tracking subsystem 306 also determines a position of the airframe 400 to set an aircraft coordinate system. In this way, photogrammetry surveying system 300 determines positions of the features relative to the airframe 400 (via the position and orientation of the UAV 302) so that the positions of the features can be expressed according to the aircraft coordinate reference frame of the airframe 400.

The UAV 302 or one of the computing devices 308A-E may then process and/or store the captured data, as shown in block 514. This may be completed virtually instantaneously or at most within five seconds from activating the photogrammetry camera 304. Storing a raw image of the features may be useful if there is relevant text or visual information on inspection tape or the TPC pertinent to the inspected features.

The position and orientation of the features may be added to a feature map via one of the computing devices 308A-E, as shown in block 516. Feature maps are a list of all features of that type on an airframe with their respective locations in the airframe and associated engineering specifications. This allows for matching scanned features to associated engineering specifications and determining if a feature's characteristic is within acceptable tolerance. Feature maps also allow for updating engineering specifications to reflect engineering changes in feature locations and specifications. If a feature map does not exist, the photogrammetry surveying system 300 can be used to reverse engineer feature locations and create a feature map that the photogrammetry surveying system 300 can use for feature inspection and tracking.

Engineering data may be loaded for multiple feature map contexts. The feature map contexts are tracked and any data requests are routed to the appropriate feature instance. Feature maps allow for a reference engineering defined feature to be matched to a set of coordinates in space from scan data. Feature maps also provide auxiliary services such as obtaining a spreadsheet of all features of that type, feature count, and other data.

Feature maps may include a computer model with virtual representations of an aircraft skin and its features. The computer model enables a user to easily visualize features, feature locations, and information about the features such as feature types and tolerances. The photogrammetry surveying system 300 may use this information for cross referencing scanned results. Feature maps may be interactive such that information about a feature may be viewed upon clicking, touching, or otherwise selecting the feature's virtual representation. For example, head height measurement data and other measurement data may be associated with fasteners in a fastener map. Data may be reviewed in a feature map via one of the HMIs or one of the client computing devices 308B,C. Color schemes may be used to indicate acceptable features versus unacceptable features. Final scanning and tracking results from the photogrammetry surveying system 300 may be stored via the remote computing devices 308D, E. The remote computing devices 308D,E provide permanent enterprise databasing of the measurement results and generation of static reports per each line unit.

Features found to be non-compliant may then be reworked, as shown in block 518. For example, non-compliant fasteners may be adjusted until compliant or replaced with compliant fasteners.

The photogrammetry surveying system 300 provides several advantages. In addition to many of the advantages provided by the feature inspection system 10 described above, the tracking subsystem 306 provides flight control feedback for autonomous flight of the UAV 302. Specifically, the UAV 302 is configured to maneuver according to a position of the UAV 302 as determined by the tracking subsystem 306. Meanwhile, photogrammetry data is associated with the position of the UAV 302 as determined by the tracking subsystem 306.

The photogrammetry surveying system 300 is also able to perform inspections with a reduction of surveying cycle time, more consistent and repeatable surveying without operator-induced variation and error, improved safety, and better image capture optimization with improved accuracy. The photogrammetry surveying system 300 requires minimal infrastructure investment compared to conventional robotic manipulators and gantry systems. The photogrammetry surveying system 300 provides rapid deployment for root cause corrective action (RCCA) and process monitoring.

Furthermore, the calibration routine and inspection routine may each be a series of computer numeric control (CNC) G-Code instructions or similar coded instructions, which facilitates user familiarity and accessibility. The CNC G-Code may be generated via user input into G-Code creation software, which may include a graphical user interface (GUI) that allows the user to intuitively create waypoints, flight segments, photogrammetry tasks, and the like without manually typing G-Code values.

ADDITIONAL CONSIDERATIONS

The description and drawings are illustrative and are not to be construed as limiting. Numerous specific details are described to provide a thorough understanding. However, in certain instances, well-known or conventional details are not described in order to avoid obscuring the description. References to one embodiment or an embodiment in the present disclosure are not necessarily references to the same embodiment; and, such references mean at least one.

The use of headings herein is merely provided for ease of reference, and shall not be interpreted in any way to limit this disclosure or the following claims.

References to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not for other embodiments. Unless excluded by explicit description and/or apparent incompatibility, any combination of various features described in this description is also included here.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A photogrammetry surveying system comprising:

an unmanned aerial vehicle (UAV) configured to fly within an enclosed surveying area, the UAV including a plurality of tracking targets;

a photogrammetry camera mounted on the UAV and configured to generate photogrammetry images of a workpiece;

a tracking subsystem including a plurality of cameras configured to optically sense the tracking targets, the tracking subsystem being further configured to determine a position of the workpiece and to generate a workpiece coordinate system, the tracking subsystem being configured to determine a position of the UAV within the workpiece coordinate system relative to the workpiece via the plurality of tracking targets; and a computing device configured to receive the photogrammetry images from the photogrammetry camera and to receive the workpiece coordinate system and the position of the UAV within the workpiece coordinate system from the tracking subsystem, the computing device further configured to determine a measurement of an aspect of a plurality of features of the workpiece based on the photogrammetry images, the computing device further configured to associate the measurement with the position of the UAV within the workpiece coordinate system as determined by the tracking subsystem to generate a real-time interface showing a feature map mapping the determined measurement of the aspect of each of the features with associated engineering specifications for the respective feature;

wherein the unmanned aerial vehicle is configured to fly within the enclosed surveying area in non-contacting, spaced apart relation with the workpiece at the same time that the scanner generates the photogrammetry images by taking photographic images of the features at a distance;

wherein the workpiece includes an aircraft skin and wherein the feature map includes a computer model with virtual representations of an aircraft skin and the features;

wherein the features are fasteners in the aircraft skin and wherein the determined measurement includes fastener head height.

2. The photogrammetry surveying system of claim 1, wherein the UAV is configured to follow a predetermined flight path.

3. The photogrammetry surveying system of claim 2, wherein the predetermined flight path is defined by a series of coded instructions.

4. The photogrammetry surveying system of claim 1, wherein the photogrammetry camera is configured to follow a predetermined photogrammetry scheme.

5. The photogrammetry surveying system of claim 4, wherein the predetermined photogrammetry scheme is defined by a series of coded instructions.

* * * * *